US012800383B2

(12) United States Patent
Wakisaka et al.

(10) Patent No.: US 12,800,383 B2
(45) Date of Patent: Nov. 17, 2026

(54) OPTICAL PULSE TEST METHOD AND OPTICAL PULSE TEST EQUIPMENT

(71) Applicant: NTT, Inc., Tokyo (JP)

(72) Inventors: Yoshifumi Wakisaka, Musashino (JP); Daisuke Iida, Musashino (JP); Yusuke Koshikiya, Musashino (JP); Takahiro Ishimaru, Musashino (JP)

(73) Assignee: NTT, Inc., Tokyo (JP)

( * ) Notice: Subject to any disclaimer, the term of this patent is extended or adjusted under 35 U.S.C. 154(b) by 281 days.

(21) Appl. No.: 18/693,014

(22) PCT Filed: Sep. 29, 2021

(86) PCT No.: PCT/JP2021/035836
§ 371 (c)(1),
(2) Date: Mar. 18, 2024

(87) PCT Pub. No.: WO2023/053263
PCT Pub. Date: Apr. 6, 2023

(65) Prior Publication Data
US 2025/0003789 A1 Jan. 2, 2025

(51) Int. Cl.
*G01H 9/00* (2006.01)
*G01D 5/353* (2006.01)

(52) U.S. Cl.
CPC ......... *G01H 9/004* (2013.01); *G01D 5/35361* (2013.01)

(58) Field of Classification Search
CPC ............... G01H 9/004; G01D 5/35361; G01D 5/35358; H04B 10/071
See application file for complete search history.

(56) References Cited

U.S. PATENT DOCUMENTS 10,461,850 B2 * 10/2019 He ..................... G01D 5/35335
2014/0176937 A1 * 6/2014 Liu .................... G01D 5/35329 356/73.1

(Continued)

FOREIGN PATENT DOCUMENTS

WO WO-2021/075015 A1 4/2021

OTHER PUBLICATIONS

Iida et al., Distributed measurement of acoustic vibration location with frequency multiplexed phase-OTDR, Feb. 21, 2017, Optical Fiber Technology 36, pp. 19-25 (Year: 2017).*

(Continued)

*Primary Examiner* — David Z Huang
(74) *Attorney, Agent, or Firm* — Harness, Dickey & Pierce, P.L.C.

(57) ABSTRACT

The present disclosure aims to reduce a strain of an observed waveform caused by a difference in proportional constant between responses of different optical frequencies of probe light resulting from vibration in a phase OTDR that uses different optical frequencies.

In order to achieve the above-described objective, the present disclosure relates to, in vibration measurement using a phase OTDR, including a compensation optical pulse with a predetermined compensation optical frequency different from an optical frequency in an optical pulse pair composed of optical pulses with different optical frequencies and making the optical pulse pair incident on a sensing fiber, calculating a phase value of the optical pulse pair based on a signal of the optical frequency from a scattered light signal based on the optical pulse pair and calculating a phase value of the compensation optical frequency based on a signal of the compensation optical frequency, plotting the phase values calculated from the scattered light signal on a two-dimensional, for each optical pulse pair plane, having the (Continued)

phase value of the compensation optical frequency represented by a horizontal axis and the phase value of the optical pulse pair represented by a vertical axis, obtaining a gradient and a vertical axis intercept of the approximate straight line calculated from the plotted data, and correcting the phase value of the optical pulse pair using the gradient and the vertical axis intercept.

6 Claims, 3 Drawing Sheets

(56) References Cited

U.S. PATENT DOCUMENTS

2021/0293612 A1* 9/2021 Cai .................... G01D 5/35383
2023/0175884 A1 6/2023 Wakisaka et al.

OTHER PUBLICATIONS

C. D. Butter and G. B. Hocker, "Fiber optics strain gauge", Appl. Opt. 17, 2867-2869 (1978).
A. E. Alekseev et al., "Fidelity of the dual-pulse phase-OTDR response to spatially distributed external perturbation," 2019, Laser Physics. 29, 055106.
A. Masoudi and T. P. Newson, "Analysis of Distributed Optical Fibre Acoustic Sensors through Numerical Modeling," Opt. Express, vol. 25, No. 25, pp. 32021-32040, Dec. 11, 2017 2017, doi: 10.1364/OE.25.032021.
M. Chen, A. Masoudi, and G. Brambilla, "Performance Analysis of Distributed Optical Fiber Acoustic Sensors based on &#xO3C6;-OTDR," Opt. Express, vol. 27, No. 7, pp. 9684-9695, Apr. 1, 2019 2019, doi: 10.1364/OE.27.009684.

* cited by examiner

OPTICAL PULSE TEST METHOD AND OPTICAL PULSE TEST EQUIPMENT

CROSS-REFERENCE TO RELATED APPLICATIONS

This application is a 371 U.S. National Phase of International Application No. PCT/JP2021/035836, filed on Sep. 29, 2021. The entire disclosure of the above application is incorporated herein by reference.

TECHNICAL FIELD

The present invention relates to an optical pulse testing method and an optical pulse testing apparatus based on a phase OTDR that uses different optical frequencies.

BACKGROUND ART

In applying an optical frequency multiplexing technique, for improving a sampling rate by injecting different optical frequency components at different timings, to the phase OTDR, when the method described in PTL 1 is used, an inherent strain term can be controlled by using a compensation optical frequency, and a vibration waveform can be directly observed.

As a matter which is not considered in PTL 1, the phase values obtained by using probe pulses with different optical frequencies differ slightly in response even when the same strain change in the sensing fibers to be measured is monitored. In the phase Optical Time Domain Reflectometer (OTDR), generally, even when different optical frequency pulses are used, an approximation, which is independent from the frequency and is constant, is used as the proportional constant of the phase change with respect to the strain change with the difference between the center frequencies kept within a range of about several GHz. According to NPL 1, for example, when a fiber with a total length of 1 elongates by Δl due to an amount of strain ε, an increase amount ΔΦ of a phase change when light passes over the elongated length of Δl is expressed by the following expression.

[Math. 1]

$$\Delta\varphi = \varepsilon l\left[\beta - \frac{1}{2}\beta n^2((1-\mu_p)p_{12} - \mu p_{11})\right] \tag{1}$$

Here, $\beta=2\pi n/\lambda$ is a propagation constant, n is an effective refractive index of the fiber, $\mu_p$ is a Poisson ratio, and $p_{11}$ and $p_{12}$ are strain-optic tensor components. For example, according to NPL 2, it is known that, considering λ=1555 nm in the vicinity of a normal communication wavelength band, the expression (2) is obtained by using the values of n=1.47, $\mu_p$=0.17, $p_{11}$=0.121, and $p_{12}$=0.271.

[Math. 2]

$$\Delta\varphi = K\varepsilon l \tag{2}$$

Where $K = 4.6\times10^6\ m^{-1}$.

Although the phase change can be replaced with the amount of strain by using this relational expression, the optical frequency dependency of each parameter in the expression (1) can be sufficiently ignored when the difference in the center frequency is within a range of about several GHz. As a result, the proportional constant K in the expression (2) can be regarded as the same between the respective frequencies of probe light used in the frequency multiplexing technique or the like.

However, in an actual phase OTDR, where the probe light used has a finite pulse width, phase measurement at each point on the fiber also has a finite spatial resolution, when strain occurs in the fiber within the range of the spatial resolution, a change in the phase value, at the point where the strain occurs, depends on the value of the optical frequency together with the change in the speckle pattern which is a factor different from optical frequency dependency of each parameter in the expression (1). This phenomenon is pointed out in, for example, NPL 1, NPL 3, NPL 4, and the like.

There are two viewpoints such as occurrence of nonlinearity corresponding to strain and a change in a proportional constant with respect to a difference in responses using probe light with different optical frequencies. The former points out that a response to strain is not ideally linear but includes a nonlinear term and a difference in the shape of the nonlinear term or the like occurs between optical frequencies.

The latter points out that a proportional constant of a phase change with respect to strain ("A" in the expression (3) to be described later) does not allow the difference between the optical frequencies to be negligible at all as in the proportional constant K shown in the expression (2), and a difference in proportional constant occurs between the optical frequencies. Among these two viewpoints, NPL 4 or the like points out that the major term is the latter.

CITATION LIST

Patent Literature

[PTL 1] WO 2021/075015 (PCT/JP 2019/040821)

Non Patent Literature

[NPL 1] C. D. Butter and G. B. Hocker, "Fiber Optics Strain Gauge," Appl. Opt. 17, 2867-2869 (1978)

[NPL 2] A. E. Alekseev et al., 2019, Laser Physics. 29, 055106

[NPL 3] A. Masoudi and T. P. Newson, "Analysis of Distributed Optical Fibre Acoustic Sensors through Numerical Modeling," Opt. Express, vol. 25, No. 25, pp. 32021-32040, 2017 Dec. 11 2017, doi: 10.1364/OE.25.032021

[NPL 4] M. Chen, A. Masoudi, and G. Brambilla, "Performance Analysis of Distributed Optical Fiber Acoustic Sensors based on & #x03C6; -OTDR," Opt. Express, vol. 27, No. 7, pp. 9684-9695, 2019 Apr. 1 2019, doi: 10.1364/OE.27.009684

SUMMARY OF INVENTION

Technical Problem

When the method of using the compensation optical frequency described in PTL 1 is used, a vibration waveform f(t) at a time t can be monitored directly at a high sampling rate. It is assumed that the number of frequencies multiplexed for improving a sampling rate is N, and a sampling interval after the sampling rate is improved is $T_N$. On condition that optical frequency multiplexing for fading control is not performed in the method described in PTL 1, when the state of a fiber at a time $(k+Nn)T_N$ (n can be any integer) at a frequency $f_k$ is measured, a phase value $y_k$ at each optical frequency can be expressed by the expression (3) with z, representing a distance from a fiber incidence end, omitted.

[Math. 3]

$$\psi_k((k+Nn)T_N) = A \cdot f((k+Nn)T_N) + B \quad (3)$$

A phase change y after the sampling rate is improved is expressed by the expression (4):

[Math. 4]

$$\psi((k+Nn)T_N) = \psi_k((k+Nn)T_N) \quad (4)$$

wherein A represents a proportional constant of the phase change with respect to a strain change f(t), and B represents an offset value of the phase change at a reference time. However, provided that an appropriate gauge length D is set, the phase value $y_k$ and the phase change y represent a phase change within a local section with a point z centered therein that is generated within a section between two points placed at an interval of the gauge length between which the point z is interposed, that is, a point z−D/2 and a point z+D/2 calculated as a phase difference obtained by subtracting a phase change at the point z−D/2 from a phase change of light at the point z+D/2, and it is assumed a phase connection process is also appropriately performed.

In the method described in PTL 1, f(t) can be observed accurately by suppressing frequency $f_k$ dependency of B.

However, considering the difference in response to a dynamic strain (vibration) using probe light with a different optical frequency described in the background, particularly, the difference in the proportional constant A between optical frequencies, frequency dependence occurs in A of the expression (3). In order to express this as a positive value, a subscript k indicating frequency dependency is added to have $A_k$, and the expression (3) is rewritten into the expression (5).

[Math. 5]

$$\psi_k((k+Nn)T_N) = A_k \cdot f((k+Nn)T_N) + B \quad (5)$$

The frequency dependence of such a proportional constant A prevents accurate measurement of f(t). For example, when f(t) is a sine wave vibrating at a vibration frequency $f_{vib}$, the following expression holds.

[Math. 6]

$$\psi_k((k+Nn)T_N) = A_k \cdot \sin(2\pi f_{vib}(k+Nn)T_N) + B \quad (6)$$

However, the phase change, obtained by substituting the expression (6) into the expression (4), includes components corresponding to the sum frequency of or the difference frequency between the frequency $f_{vib}$ and a frequency $1/(NT_N)$, and the observed phase change is a factor of a shape or the like different from the actual vibration waveform f(t). Expressions (3) to (6) will be discussed with regard to a case where optical frequency multiplexing for fading suppression is not performed. In the case where optical frequency multiplexing for fading suppression is performed, fiber states at different timings are monitored for different kinds of frequency pulse pairs as described in PTL 1. More specifically, signals of main optical frequencies excluding the compensation optical frequency included in the same pulse pair are averaged, and a phase after fading suppression in the pulse pair is calculated. A vibration waveform is calculated by further performing correction using a signal of a compensation optical frequency for the calculated phase. That is, even in frequency multiplexing for fading control, when the phase after averaging the signals of the main optical frequencies except the compensation optical frequency is written as $k for the signals obtained by the k-th type pulse pair, the above-mentioned expressions (3) and (4) hold as they are. For the expressions (5) and (6), if Ak is interpreted as a value obtained by averaging responses to the vibration of each optical frequency included in the k-th type pulse pair, the value is established as it is. Also in this case, since Ak is a value obtained by averaging the responses of a finite number of optical frequencies included in the k-th type pulse pair, Ak corresponding to a different type, that is, a different k of pulse pair, has a different value, and thus the problem of impossibility of accurately measuring f(t), which was concluded using the expression (6) above, still remains.

To solve the above problem, the present invention aims to provide an optical pulse testing method and an optical pulse testing apparatus capable of reducing a strain of an observation waveform caused by a difference in proportional constant in a response, between different optical frequencies of probe light, to vibration and expanding a dynamic range of the magnitude of vibration that can be accurately observed in a phase OTDR using different optical frequencies.

Solution to Problem

In order to achieve the above objective, according to the present disclosure, in a phase OTDR, probe light with a plurality of different optical frequencies and probe light with a compensation optical frequency different from each of the different optical frequencies are injected at a timing regarded as the same timing, approximate straight lines approximating a relationship between a phase value obtained from the probe light with each of the optical frequencies and a phase value obtained from the probe light with the compensation optical frequency are obtained, and a phase value obtained from probe light with each main optical frequency is corrected, based on the slope and the intercept of each of the obtained approximate straight lines.

Specifically, an optical pulse testing method according to the present disclosure is

- an optical pulse testing method for measuring vibration by means of the phase OTDR, the optical pulse testing method including
- making an optical pulse pair composed of optical pulses with different optical frequencies incident on a sensing fiber at a constant interval,
- including a compensation optical pulse with a predetermined compensation optical frequency different from the optical frequency included in the specific optical pulse pair and making the optical pulse pair incident on the sensing fiber, acquiring a scattered light signal for each of the optical frequency and the compensation optical frequency from the specific optical pulse pair that is incident including the compensation optical pulse, calculating a phase value of the optical pulse pair in which fading noise was suppressed by averaging signals of different optical frequencies included in the optical frequency for each point on the sensing fiber in a longitudinal direction from the scattered light signal, calculating a phase value of the compensation optical frequency at which fading noise was suppressed by averaging signals of different optical frequencies included in the compensation optical frequency for each point on the sensing fiber in the longitudinal direction from the scattered light signal, plotting the phase value of the optical pulse pair and the phase value of the compensation optical frequency detected for each point on the sensing fiber in the longitudinal direction on a two-dimensional plane having the phase value of the compensation optical frequency represented by a horizontal axis and the phase value of the optical pulse pair represented by a vertical axis, calculating an approximate straight line for the plotted data for each optical pulse pair, and correcting the phase value of the optical pulse pair according to expression (C1) by using a gradient $A_{k,c}$ and a vertical axis intercept $B_{k,c}$ of the approximate straight line calculated for each optical pulse pair:

[Math. C1]

$$\alpha_k((k+Nn)T_N) = \frac{\psi_k((k+Nn)T_N) - B_{k,c}}{A_{k,c}} A_{ave,c} \tag{C1}$$

wherein, k represents a kind of an optical pulse pair (an optical frequency when fading is not suppressed), $\alpha_k$ represents a phase value of a k-th kind of the optical pulse pair, n represents an arbitrary integer, $T_N$ represents the constant interval, N represents the number of pulse pairs multiplexed, $\psi_k$ represents a phase value of the k-th kind of optical pulse pair after being subject to fading suppression obtained by averaging different main optical frequencies included in the pulse pair (a phase value of an optical frequency fk when fading suppression is not performed), and $A_{ave,c}$ represents an average value of the gradients $A_{k,c}$ with respect to k, provided that, when the optical frequency multiplexing for suppressing fading noise is not performed, the averaging process for suppressing fading noise is not performed in the above-mentioned procedures.

In addition, the optical pulse testing method according to the present disclosure may further include acquiring a scattered light signal from a normal optical pulse pair other than the specific optical pulse pair, detecting the phase value of the optical pulse pair in which fading noise was suppressed by averaging the signals of the optical frequency included in the normal optical pulse pair at each point on the sensing fiber in the longitudinal direction from the scattered light signal acquired based on the normal optical pulse pair, and correcting the detected phase value of the normal optical pulse pair according to expression (C1) by using the gradient $A_{k,c}$ and the vertical axis intercept $B_{k,c}$ of the approximate straight line.

Specifically, an optical pulse testing apparatus according to the present disclosure is an optical pulse testing apparatus for measuring vibration by means of the phase OTDR, the optical pulse testing apparatus including a light source configured to enable an optical pulse pair composed of optical pulses with different optical frequencies to be incident on a sensing fiber at a constant interval and enable the specific optical pulse pair to include a compensation optical pulse with a predetermined compensation optical frequency that is different from the optical frequency and to be incident on the sensing fiber, a light receiver configured to acquire a scattered light signal for each of the optical frequency and the compensation optical frequency from the specific optical pulse pair that is incident including the compensation optical pulse, and a signal processing unit configured to calculate a phase value of the optical pulse pair in which fading noise was suppressed by averaging signals of different optical frequencies included in the optical frequency for each point on the sensing fiber in the longitudinal direction from the scattered light signal, calculate a phase value of the compensation optical frequency at which fading noise was suppressed by averaging signals of different optical frequencies included in the compensation optical frequency for each point on the sensing fiber in the longitudinal direction from the scattered light signal, plot the phase value of the optical pulse pair and the phase value of the compensation optical frequency detected for each point on the sensing fiber in the longitudinal direction on a two-dimensional plane having the phase value of the compensation optical frequency represented by a horizontal axis and the phase value of the optical pulse pair represented by a vertical axis, calculate an approximate straight line for the plotted data for each optical pulse pair, and correct the phase value of the optical pulse pair according to expression (C2) by using a gradient $A_{k,c}$ and a vertical axis intercept $B_{k,c}$ of the approximate straight line calculated for each optical pulse pair:

[Math. C2]

$$\alpha_k((k+Nn)T_N) = \frac{\psi_k((k+Nn)T_N) - B_{k,c}}{A_{k,c}} A_{ave,c} \tag{C2}$$

wherein, k represents a kind of an optical pulse pair (an optical frequency when fading is not suppressed), $\alpha_k$ represents a phase value of a k-th kind of the optical pulse pair, n represents an arbitrary integer, $T_N$ represents the constant interval, N represents the number of pulse pairs multiplexed, $\psi_k$ represents a phase value of the k-th kind of optical pulse pair after being subject to fading suppression obtained by averaging different main optical frequencies included in the pulse pair (a phase value of an optical frequency fk when fading suppression is not performed), and $A_{ave,c}$ represents an average value of the gradients $A_{k,c}$ with respect to k, provided that, when the optical frequency multiplexing for suppressing fading noise is not performed, the averaging process for suppressing fading noise is not performed in the above-mentioned procedures.

In addition, in the optical pulse testing apparatus according to the present disclosure,

- a scattered light signal may be acquired from a normal optical pulse pair other than the specific optical pulse pair,
- the phase value of the optical pulse pair may be detected, in which fading noise was suppressed by averaging the signals of the optical frequency included in the normal optical pulse pair at each point on the sensing fiber in the longitudinal direction from the scattered light signal acquired based on the normal optical pulse pair, and
- the detected phase value of the normal optical pulse pair may be corrected according to expression (C2) by using the gradient $A_{k,c}$ and the vertical axis intercept $B_{k.c}$ of the approximate straight line.

According to the present disclosure, in the phase OTDR, probe light pulse pairs of different types with a plurality of different optical frequencies and probe light with a compensation optical frequency, which is not included in any of the pulse pairs of different types, are injected at a timing regarded as the same timing, approximate straight lines approximating a relationship between a phase value obtained from the probe light of each of the optical pulse pairs and a phase value obtained from the probe light with the compensation optical frequency are obtained, and a phase value obtained from the probe light of each of the optical pulse pairs is corrected based on the slope and the intercept of each of the obtained approximate straight lines. Thus, it is practical to provide an optical pulse testing method and an optical pulse testing apparatus capable of reducing a strain of an observation waveform caused by a difference in proportional constant in a response, between different optical frequencies of probe light, to vibration and expanding a dynamic range of the magnitude of vibration that can be accurately observed, in a phase OTDR using different optical frequencies.

The above inventions can be combined as much as possible.

Advantageous Effects of Invention

According to the present disclosure, it is practical to provide an optical pulse testing method and an optical pulse testing apparatus capable of reducing a strain of an observation waveform caused by a difference in proportional constant in a response, between different optical frequencies of probe light, to vibration and expanding a dynamic range of the magnitude of vibration that can be accurately observed in a phase OTDR using different optical frequencies.

DESCRIPTION OF EMBODIMENTS

Embodiments of the present disclosure will be described hereinafter in detail with reference to the drawings. The present invention is not limited to the embodiments to be described below. These embodiments are merely exemplary and the present disclosure can be implemented in various modified and improved modes based on the knowledge of those skilled in the art. Further, constituent elements with the same reference signs in the present specification and the drawings are assumed to represent the same ones.

SUMMARY OF INVENTION

The present invention provides a method for alleviate, by signal processing based on measured data, the problem that an observed phase change has a different shape from that of an actual vibration waveform and the like particularly due to a difference in proportional constant between optical frequencies among differences in response to a dynamic strain (vibration) using probe light of different optical frequencies. By utilizing the present invention, it is possible to expand the dynamic range of the magnitude of vibration that can be observed accurately when using the method utilizing the compensation optical frequency described in PTL 1. A specific feature of the procedure of the present invention is that a phase value, obtained from a scattered light signal obtained by injecting each optical pulse pair composed of a compensation optical frequency and a plurality of different main optical frequencies at timings regarded as the same timing, is used to create a plot on a two-dimensional plane, in which the horizontal axis represents phase value of the compensation optical frequency and the vertical axis represents phase value of each optical pulse pair, for each point on a sensing fiber, an approximate straight line is calculated with respect to the plotted data, the values of the slope and the vertical axis intercept of the calculated approximate straight line are used to correct the phase value of each optical pulse pair, and thereby a vibration waveform is measured at a spot where vibration occurs more accurately than that before the correction.

EMBODIMENT

Figure 1:
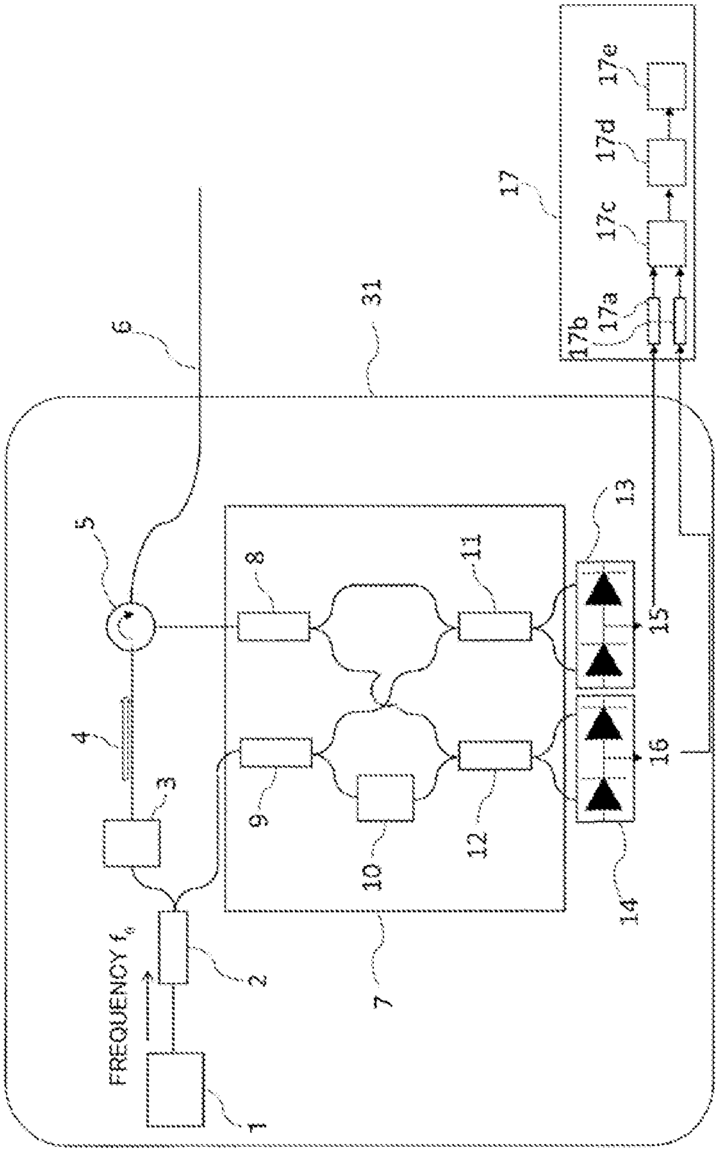
FIG. 1 illustrates an example of a schematic configuration of an optical pulse testing apparatus according to the present invention.

FIG. 1 is a diagram for explaining an optical pulse testing apparatus for detecting vibration by means of Distributed Acoustic Sensing-Phase (DAS-P) according to the present embodiment.

The optical pulse testing apparatus according to the present embodiment is an optical pulse testing apparatus for measuring vibration by means of a phase OTDR, the optical pulse testing apparatus including:

- a light source that enables an optical pulse pair composed of optical pulses with different optical frequencies (main optical frequencies) to be incident on a sensing fiber at a constant interval and enables the specific optical pulse pair to include a compensation optical pulse with a predetermined compensation optical frequency that is different from the optical frequency and to be incident on the sensing fiber;
- a light receiver that acquires a scattered light signal for each of the optical frequency and the compensation optical frequency from the incident specific optical pulse pair including the compensation optical pulse; and
- a signal processing unit that calculates a phase value of the optical pulse pair in which fading noise was suppressed by averaging signals of different optical frequencies included in the optical frequency for each point on the sensing fiber in a longitudinal direction from the scattered light signal, calculates a phase value of the compensation optical frequency at which fading noise was suppressed by averaging signals of different optical frequencies included in the compensation optical frequency for each point on the sensing fiber in the longitudinal direction from the scattered light signal, plots the phase value of the optical pulse pair and the phase value of the compensation optical frequency detected for each point on the sensing fiber in the longitudinal direction on a two-dimensional plane having the phase value of the compensation optical frequency represented by a horizontal axis and the phase value of the optical pulse pair represented by a vertical axis, calculate an approximate straight line for the plotted data for each optical pulse pair, and correct the phase value of the optical pulse pair according to an expression (1-7) by using a gradient $A_{k,c}$ and a vertical axis intercept $B_{k,c}$ of the approximate straight line calculated for each optical pulse pair.

A vibration measuring device 31 includes a CW light source 1, a coupler 2, an optical modulator 3, a 90-degree optical hybrid 7, and balance detectors (13, 14). The CW light source 1, the coupler 2, and the optical modulator 3 corresponds to the light source described above. The 90-degree optical hybrid 7 and the balance detectors (13 and 14) correspond to the light receiver described above. The light receiver performs coherent detection using the 90-degree optical hybrid 7. A signal processing device 17 corresponds to the signal processing unit described above. However, it is not always necessary to use a 90-degree optical hybrid for the light receiver, and another device or signal processing may be used as long as the in-phase component and the quadrature component of the scattered light can be measured. In addition, the signal processing device 17 according to the present disclosure can also be realized by a computer and a program, and the program can be recorded in a recording medium or can also be provided via a network.

Figure 2:
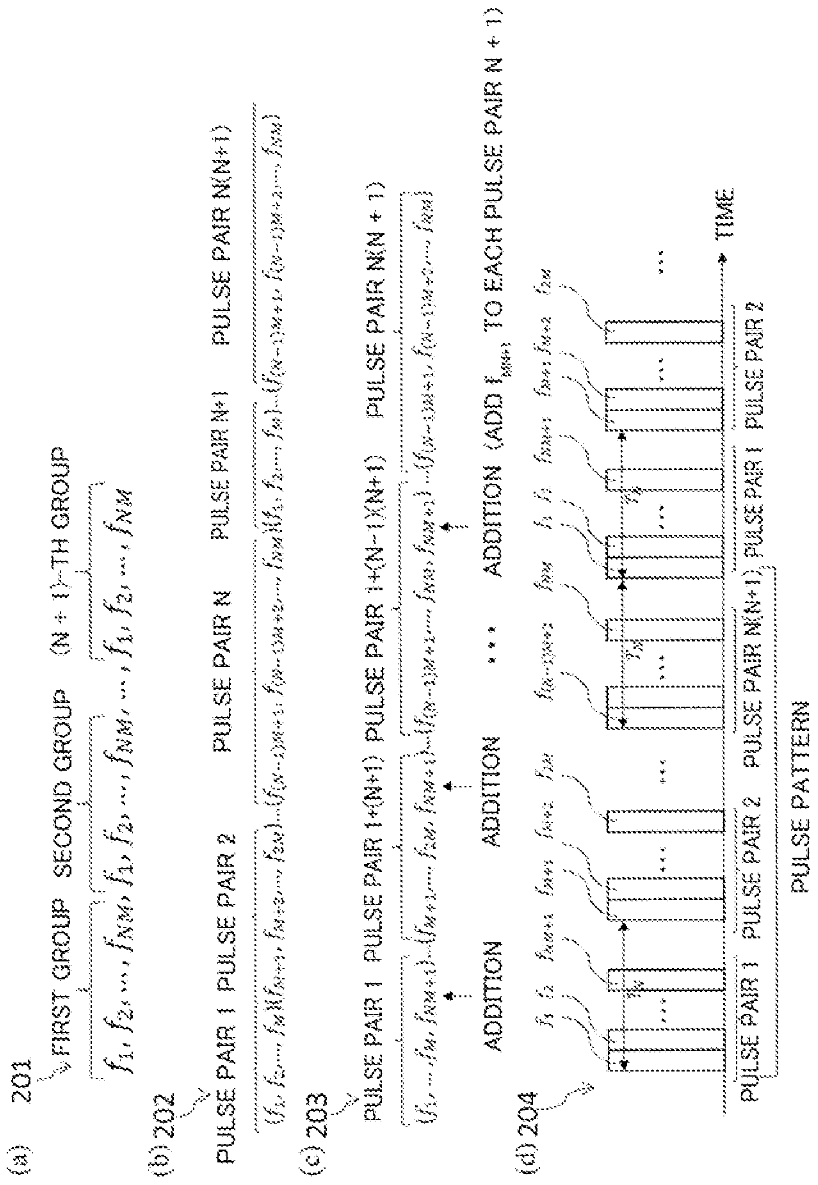
FIG. 2 illustrates examples of optical frequencies and optical pulse trains used in the present invention.

The vibration measuring device 31 measures scattered light from a measurement subject optical fiber 6 as follows. Continuous light with a single wavelength and a frequency of $f_0$ is emitted from the CW light source 1 and split to reference light and probe light by the coupler 2. The probe light is shaped by the optical modulator 3 into an optical pulse 4 with frequency multiplexed. A configuration example of the optical pulse 4 is shown in FIG. 2. Further, In the following description, a sensing fiber to be measured is called a measurement subject optical fiber 6. N+1 groups arranged in order are prepared with N×M main optical frequency components from $f_1$ to $f_{NM}$ used for main pulses. A combination of the groups is a group combination 201. The whole arrangement of the group combination 201 is divided for every M pieces (M is an arbitrary natural number) from the left, N(N+1) pulse pairs are generated to form a pulse pair combination 202. Here, N represents the number of pulses to be multiplexed in the pulse pair combination 202. That is, in the pulse pair combination 202, N×M components from $f_1$ to $f_{NM}$ are separated by M, so N kinds of pulse pairs are generated, and the N kinds of pulse pairs are repeated by N+1 that is the number of groups. Thereafter, N is used as a symbol for distinguishing these N kinds of optical pulse pairs. A compensation optical frequency $f_{NM}$+1 is added to a 1+d(N+1)-th pulse pair (d=0, 1, . . . , (N−1)) in the pulse pair combination 202 to generate a pulse pair combination 203. d is a symbol different from k for distinguishing the type of a pulse pair, and there is an object corresponding to the same type, that is, the same k, even for the pulse pair corresponding to the different d. An optical pulse pair train actually made incident based on the pulse pair combination 203 is formed as represented by reference numeral 204. Thus, a pulse pattern in which N(N+1) pulse pairs are arranged at a fixed time cycle is generated. Here, in the optical pulse pair train 204, M or M+1 optical pulses constituting the pulse pair train are arranged at a time interval at which a change in the state of the optical fiber due to vibration is negligible, similarly to the optical pulses constituting the pulse pair train described in PTL 1. Further, although the above-described example has been described in which frequency multiplexing for controlling fading noise is not performed at the compensation optical frequency, frequency multiplexing for controlling fading noise may also be performed at the compensation optical frequency as described in PTL 1. In this regard, the number of frequency components constituting each pulse pair is as follows: M in regards to the pulse pair to which the compensation optical frequency is not added; and the value obtained by adding the number of optical frequencies multiplexed for controlling fading at the compensation optical frequency to M in regards to the pulse pair to which the compensation optical frequency is added. The following description is continued for the sake of simplicity for the case where the number of compensation optical frequencies is one, but the present invention can be applied to a case where the number of compensation optical frequencies is multiple. Although the time interval between minute pulses keeping a state change in the optical fiber negligible is dependent on a vibrational frequency fv and the magnitude of vibration, normally, it is adequately necessary to set the time interval around 1 μs or less. Thus, it is regarded that optical pulses with an arbitrary optical frequency included in the same pulse pair train including the compensation optical frequency are simultaneously incident.

Here, since the compensation optical frequency $f_{NM}$+i is added to a pulse pair having a pulse pair number of 1+d (N+1) (d=0, 1, . . . , (N−1)), for example, on condition of N=3 and M=1, a pulse pair of optical frequencies $f_1$, $f_2$, and $f_3$ is repeatedly made injected into the measurement subject optical fiber 6. In this example, when d=0, a compensation optical frequency $f_4$ is added to a pulse pair 1 with the optical frequency $f_1$, when d=1, the optical frequency $f_4$ is added to a pulse pair 5 with the optical frequency $f_2$, and when d=2, the optical frequency $f_4$ is added to a pulse pair 9 with the optical frequency $f_3$.

If the interval between the pulse pairs is set to $T_N$, the limitation on the minimum value of to what extent $T_N$ based on the length of the measurement subject optical fiber 6 can be reduced is relaxed by 1/N times as compared with the case where a single optical frequency pulse is used. This is because, unlike the circumstances of a single optical frequency, by using optical pulses of a plurality of optical frequencies, an optical pulse of an optical frequency different from the optical frequency of incident optical pulse is injected during the reciprocal time of the injected optical pulse and thus it is practical to continuously measure reflected light. In addition, in the pulse pairs shown in FIG. 2, the fading noise can be reduced according to PTL 1 by using M pulses existing in each pulse pair.

In FIG. 1, a type of the optical modulator 3 is not specifically designated as long as it can generate the optical pulse 4, in some cases, the number of optical modulators 3 may be plural. For example, a single side band (SSB) modulator, a frequency-variable acousto-optics (AO) modulator, or the like may be used, or intensity modulation by a semiconductor optical amplifier (SOA) or the like may be further performed in order to increase an extinction ratio in pulsation. Further, although the pulse of each optical frequency component represented by 204 has a rectangular wave shape, it is also possible to use a waveform other than the rectangular wave.

As shown in FIG. 1, the optical pulse 4 is incident on the measurement subject optical fiber 6 via a circulator 5. Light scattered at each point on the measurement subject optical fiber 6 in the longitudinal direction returns to the circulator 5 as back-scattered light and is incident on one input unit of the 90-degree optical hybrid 7. Reference light split by the coupler 2 is incident on the other input unit of the 90-degree optical hybrid 7.

The 90-degree optical hybrid 7 may be employ any internal configuration as long as it has functions of a 90-degree optical hybrid. FIG. 1 illustrates a configuration example of the 90-degree optical hybrid 7. Back-scattered light is incident on a coupler 8 having a split ratio of 50:50, and the two split beams of the scattered light are incident on the input unit of a coupler 12 having a split ratio of 50:50 and a coupler 11 having a split ratio of 50:50. The reference light is injected into a coupler 9 having a split ratio of 50:50, and one beam of the two split beams of the reference light is injected into the input unit of the coupler 11 and the other is injected into the input unit of the coupler 12 with its phase shifted by π/2 by a phase shifter 10.

Two outputs of the coupler 11 are detected by a balance detector 13 and an electrical signal 15 that is an analog in-phase component $I^{analog}$ is output. Two outputs of the coupler 12 are detected by a balance detector 14 and an electrical signal 16 that is an analog quadrature component $Q^{analog}$ is output.

The electrical signal 15 and the electrical signal 16 are sent to a signal processing device 17 provided with an analog-to-digital (AD) conversion element 17_a_ and an AD conversion element 17_b_ capable of sampling a frequency range of a signal without aliasing. In the signal processing device 17, a signal processing unit 17_c_ separates signals of a digitalized in-phase component $I^{digital}$ and a digitalized quadrature component $Q^{digital}$ output from the AD conversion element 17_a_ and the AD conversion element 17_b_ into signals in the bands of individual frequencies $f_0+f_1$ (i=1, 2, . . . , NM+1) constituting the optical pulse 4. As a specific signal processing method, any method may be used as long as the method can accurately separate $I_i^{measure}$ (i=1, 2, . . . , NM+1) and $Q_i^{measure}$ (i=1, 2, . . . , NM+1), which are signals in individual bands, from $I^{digital}$ and $Q^{digital}$. For example, since the band center of a signal obtained by probe light with an optical frequency $f_0+f_1$ is down-shifted to $f_1$ after coherent detection, a calculation method for compensating a phase delay by passing $I^{digital}$ and $Q^{digital}$ through a band pass filter with a center frequency $f_1$ can be considered. For example, when a band pass filter is used, if the pulse width of each optical frequency component is set to W, the pass band can be set to 2/W. Alternatively, the in-phase component and the quadrature component in the state of an analogue electric signal may be separated into individual frequency components by an analogue electric filter, and then AD-converted by the AD conversion element 17_a_ and the AD conversion element 17_b_.

Based on $I_i^{measure}$ and $Q_i^{measure}$ acquired by the signal processing unit 17_c_, a phase is calculated by a signal processing unit 17_d_. First, a complex vector $r_i$ is created on an xy plane of which an x-axis (a real number axis) represents an in-phase component and a y-axis (an imaginary number axis) represents a quadrature component as expressed in the expression (1-1).

[Math. 1-1]

$$r_i = (I_i^{measure}, Q_i^{measure}) \tag{1-1}$$

It is assumed that a time point at which the head of the k-th type pulse pair is incident is set to $k \times T_N + n \times N \times T_N$ (n is any integer). By adopting the optical frequency of the head of each pulse pair as a reference wavelength and averaging vectors calculated according to expression (1-1) in the bands of M different optical frequencies, excluding the compensation optical frequency, constituting the pulse pair in accordance with the method described in "Appendix" of PTL 1, the phase at the position of a distance z from the incidence end is calculated. The state of the measurement subject optical fiber 6 at the position in the distance z from the incidence end on the measurement subject optical fiber 6 in the longitudinal direction is measured at the time point $k \times T_N + n \times N \times T_N + z/v$ (n is any integer) in consideration of a propagation time of an optical pulse. Here, v represents the speed of light in the measurement subject optical fiber 6. Furthermore, considering the time for scattered light having been scattered to propagate and return to the incidence end, a measurement time point of the vibration measuring device 31 is $k \times T_N + n \times N \times T_N + 2z/v$ (n is any integer). Therefore, the phase calculated at the point in the distance z is represented by the expression (1-2), in which the measurement time point of the vibration measuring device 31 is represented by a positive value.

[Math. 1-2]

$$\theta_k\left(z, kT_N + nNT_N + \frac{2z}{v}\right) \tag{1-2}$$

In the present embodiment, a phase θ (z, $mT_N+2z/v$) at a measurement time point $mT_N+2z/v$ (m represents an integer) is calculated as follows using k and n that satisfy $mT_N+2z/v=kT_N+nNT_N+2z/v$.

[Math. 1-3]

$$\theta\left(z, mT_N + \frac{2z}{v}\right) = \theta_k\left(z, kT_N + nNT_N + \frac{2z}{v}\right) \tag{1-3}$$

In addition, a phase change due to vibration applied within a section from a distance $z_1$ to a distance $z_2$ on the measurement subject optical fiber 6 is calculated by using the difference between the expression (1-3a) and the expression (1-3b), that is, the expression (1-3c).

[Math. 1-3a]

$$\theta\left(z_2, mT_N + \frac{2z_2}{v}\right) \tag{1-3a}$$

[Math. 1-3b]

$$\theta\left(z_1, mT_N + \frac{2z_1}{v}\right) \tag{1-3b}$$

[Math. 1-3c]

$$\theta\left(z_2, mT_N + \frac{2z_2}{v}\right) - \theta\left(z_1, mT_N + \frac{2z_1}{v}\right) \tag{1-3c}$$

Further, since a time point of a moment at which a state of the measurement subject optical fiber 6 is measured does not include a time taken by scattered light to return to the injection end as described above, a time point at a point of the distance $z_1$ is $mT_N+z_1/v$ and a time point at a point of the distance $z_2$ is $mT_N+z_2/v$, which means that there is a time difference $(z_1-z_2)/v$. However, since a difference in distance between $z_1$ and $z_2$ is more or less equal to spatial resolution and is usually set around several meters to several tens meters, the time difference $(z_1-z_2)/v$ becomes several tens to several hundreds of nanoseconds and is extremely short compared to an ordinary scale of time change in vibration to be measured, and thus a difference in time point at which the state of the measurement subject optical fiber 6 is measured is negligible. Therefore, the vibration applied within the section can be correctly measured.

However, $\theta(z, mT_N+2z/v)$ includes a strain term due to an angular difference between optical frequencies of the heads of different types of optical pulse pairs. PTL 1 proposes a method of correcting the angular difference using a compensation optical frequency. Performing correction of angle differences between different optical frequencies without omission requires performing correction of an angle difference between the optical frequencies of heads of any two pulse pairs. When positive integers i and j satisfying i<j are freely selected, $f_i^{pf}$ represent an optical frequency of the head of a pulse pair j and $f_i^{pf}$ represent an optical frequency of the head of a pulse pair i, an angular difference $((z, f_j^{pf}, f_i^{pf})$ can be expanded using $f_{NM}+1$ as follows.

[Math. 1-4]

$$\varphi(z, f_j^{pf}, f_i^{pf}) = \varphi(z, f_j^{pf}, f_{NM+1}) + \varphi(z, f_{NM+1}, f_i^{pf}) \quad (1\text{-}4)$$

i and j are any positive integers. Wherein i<j is satisfied.

In the combination 203 of optical frequencies of pulse pairs that are used as an example, since the optical frequency $f_{NM}+1$ is added to the pulse pair of which the pulse pair number is $1+d(N+1)$ ($d=0, 1, \ldots, (N-1)$), a pulse pair where the optical frequency $f_{NM}+1$ exists and a pulse pair where other frequency or frequencies exist always become the same once within a period $N(N+1)T_N$. For example, when N=3 and M=1, the number of pulse pairs constituting a pulse pattern is 12. In this example, the first pulse pair includes an optical frequency $f_1$ and an optical frequency $f_4$, the fifth pulse pair includes an optical frequency $f_2$ and the optical frequency $f_4$, and the ninth pulse pair includes an optical frequency $f_3$ and the optical frequency $f_4$. Therefore, the optical frequency $f_4$ and the other frequencies $f_1$, $f_2$, and $f_3$ are always present in the same pulse pair once in the pulse pattern. Therefore, each term on the right side of the expression (1-4) can be calculated by using the expression (2-3) of PTL 1 as described in PTL 1. Using the obtained value of $\Phi(f_j^{pf}, f_i^{pf})$, a final phase is calculated from $\theta(z, mT_N+2z/v)$ in the method described in PTL 1. Specifically, the phase value obtained by correcting the strain term is calculated. Next, a gauge length D is set, and a difference between the phase change of the point z−D/2 and the phase change of the point z+D/2 is calculated, and thereby a vibration waveform generated in the range of the gauge length D of the point z is calculated. At this time, phase connection processing or the like is appropriately performed. As a result, a phase value yk and a phase value y of the k-th kind of pulse pair described in the background are obtained.

The present invention alleviates the problem that, by the signal processing unit 17*e*, an observed phase change has a different shape from that of an actual vibration waveform and the like particularly due to a difference in proportional constant between optical frequencies among differences in response to a dynamic strain (vibration) using probe light with different optical frequencies.

Specifically, the optical pulse testing method according to the present embodiment is an optical pulse testing method for measuring vibration by means of a phase OTDR and includes making an optical pulse pair composed of optical pulses of different optical frequencies incident on a sensing fiber at a constant interval (step S001), including a compensation optical pulse with a predetermined compensation optical frequency different from the optical frequency included in the specific optical pulse pair and making the compensation optical pulse incident on the sensing fiber (step S002), acquiring a scattered light signal for each of the optical frequency and the compensation optical frequency from the specific optical pulse pair that is incident including the compensation optical pulse (step S003), calculating, from the scattered light signal, a phase value of the optical pulse pair in which fading noise was suppressed by averaging signals of different optical frequencies included in the optical frequency for each point on the sensing fiber in the longitudinal direction, and calculating a phase value of the compensation optical frequency at which fading noise is suppressed by averaging signals of different optical frequencies included in the compensation optical frequency (step S004 and step S101), plotting the phase value of the optical pulse pair and the phase value of the compensation optical frequency detected for each point on the sensing fiber in the longitudinal direction on a two-dimensional plane having the phase value of the compensation optical frequency represented by the horizontal axis and the phase value of the optical pulse pair represented by the vertical axis (step S102), calculating an approximate straight line for the plotted data for each optical pulse pair (step S103), and correcting the phase value of the optical pulse pair according to the expression (1-7) by using a gradient $A_{k,c}$ and a vertical axis intercept $B_{k,c}$ of the approximate straight line calculated for each optical pulse pair (step S104).

Here, steps S001 and S002 are realized by the light source generating an optical pulse pair train and making it incident on the measurement subject optical fiber, as described in FIG. 2. In addition, in S003, the light receiver performs the operation as described above. In step S004, regarding the optical pulse pair including the k-th kind pulse pair and the optical pulse of the compensation optical frequency, the signal processing unit 17*d* individually detects the phase values of the k-th kind pulse pair and the compensation optical frequency as mentioned previously with respect to each distance z from the injection end on the measurement subject optical fiber 6 in the longitudinal direction for. The phase value of the compensation optical frequency is detected in step S101.

Figure 3:
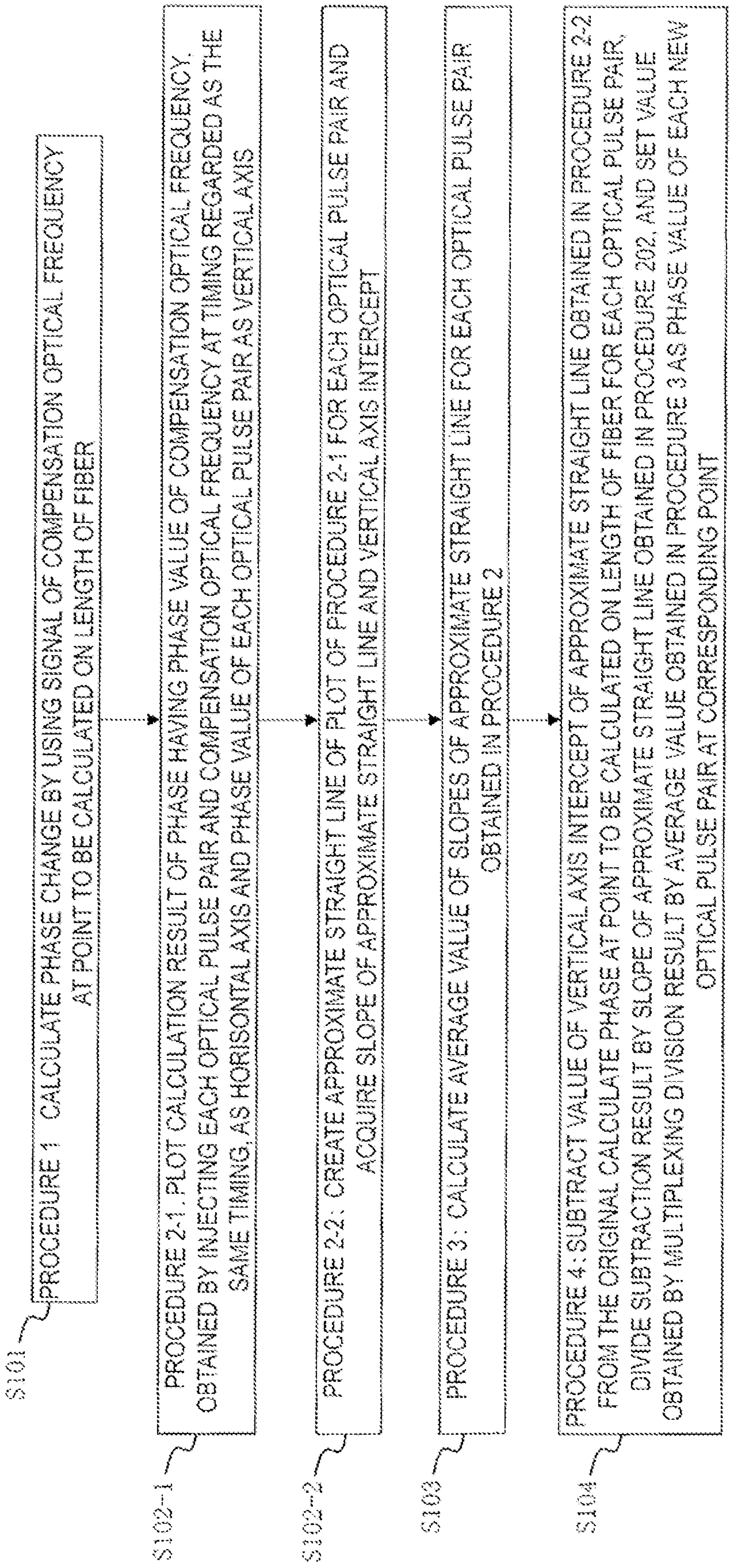
FIG. 3 illustrates an example of the procedure of an optical pulse testing method according to the present invention.

Although the example of M=1 will be mainly described below, in other cases, the same processing as in the following example can be performed in the phase after averaging for reducing fading noise is first performed as described in PTL 1. Even when the compensation optical frequency is multiplexed for reducing fading noise, the same processing as in the following example can be performed by using the phase after the fading noise processing is performed. Therefore, the proposed method can be used for any N and M. Furthermore, the compensation optical frequency may be frequency-multiplexed by an arbitrary number for suppressing fading noise. The signal processing related to the present invention includes steps S101 to S104 as shown in the flowchart of FIG. 3.

(Step S101)

First, a phase change is calculated by detecting the phase value of the compensation optical frequency. Here, with respect to probe light described above, since in spite of the interval $(N+1)T_N$ also applied to the compensation optical frequency, the probe light is repeatedly injected into the measurement optical fiber, the phase calculation focuses on the point that the signal of the compensation optical frequency is used and the vibration waveform generated in the range of the gauge length D at the point z can be calculated, and the calculated phase is set as $y_c(z, (1+(N+1)n)T_N)$. The variable n is any integer. However, it is assumed that a phase connection processing and the like are appropriately executed. The phase can also be expressed simply as $y_c((1+(N+1)n)T_N)$ by omitting the point z. The compensation optical frequency can also be written as follows for the actual vibration waveform f(t) by using a proportional constant $A_c$ in the same manner as in the expression (5).

[Math. 1-5]

$$\psi_c((1+(N+1)n)T_N) = A_c \cdot f((1+(N+1)n)T_N) + B_c \tag{1-5}$$

Here, it is noted that a constant component $B_c$ of the compensation optical frequency in the expression (1-5) is generally different from B in the expression (5).

(Step S102)

At a time point $(k+(k-1)N+N(N+1)n)T_N$ Of injecting a pulse pair including a k-th kind of pulse pair whose compensation optical frequency and leading optical frequency are f(k−1)M+1, the pulse pair is injected at the same time point as that of the compensation optical frequency and an selected main frequency included in the k-th kind of pulse pair. In the case of M=1 as a specific example, the main optical frequency included in the k-th kind of pulse pair is only one of $f_k$. The fact that the incidence time can be regarded as the same time can be assumed that the same vibration waveform f(t) is measured at the main optical frequency and the compensation optical frequency, and $y_c$ and $y_k$ can be associated with each other as follows based on the expressions (5) and (1-5).

[Math. 1-6]

$$\begin{aligned}\psi_k((k+(k-1)N+N(N+1)n)T_N) &= \\ \frac{A_k}{A_c}\psi_c((k+(k-1)N+N(N+1)n)T_N) - \frac{A_k}{A_c}\cdot B_c + B &= \\ A_{k,c}\psi_c((k+(k-1)N+N(N+1)n)T_N) + B_{k,c}\end{aligned} \tag{1-6}$$

In the expression (1-6), the proportional constant term is assumed to be $A_{k,c}$, and the constant term is assumed to be $B_{k,c}$. That is, when the measured value of $y_c((k+(k-1)N+N(N+1)n)T_N)$ is plotted on the horizontal axis and the measured value of $y_k((k+(k-1)N+N(N+1)n)T_N)$ is plotted on the vertical axis (step S102-1) and an approximate straight line with respect to the plotted data is created, the value $A_{k,c}$ is obtained from the slope of the approximate straight line and values $B_{k,c}$ is obtained from the vertical axis intercept in an ideal situation where noise is negligible (step S102-2). A general method such as the least square method can be used for the method of creating the approximate straight line.

Step S102 may be performed for all N kinds of pulse pairs, or may be performed for each of some kinds of pulse pairs.

(Step S103)

An average value of the gradients $A_{k,c}$ with respect to k of the approximate straight lines obtained by the optical pulse pairs of each kind k, for example, each main optical frequency $f_k$ in the case of M=1 is calculated to be set as $A_{ave,c}$. When only some kinds of optical pulse pairs are used in the step S102, an average value related to some kinds of optical pulse pairs may be calculated to be set as $A_{ave,c}$.

(Step S104)

With respect to the optical pulse pair of each kind k, if the time point when the optical pulse is not incident at the same time as the compensation optical frequency is included, the phase value is measured at the time point $(k+Nn)T_N$. The phase values are corrected as follows by using $A_{k,c}$, $B_{k,c}$, and $A_{ave,c}$ obtained up to the procedure 3. The phase value after the correction is defined as a.

[Math. 1-7]

$$\alpha_k((k+Nn)T_N) = \frac{\psi_k((k+Nn)T_N) - B_{k,c}}{A_{k,c}}A_{ave,c} \tag{1-7}$$

The phase after the correction suppresses a difference in response to a dynamic strain (vibration) using probe light of different optical frequencies.

In an optical pulse testing method implemented by an optical pulse testing apparatus according to the present embodiment, a scattered light signal may be acquired from a normal optical pulse pair other than the specific optical pulse pair, the phase value of the optical pulse pair may be detected, in which fading noise was suppressed by averaging the signals of the optical frequency included in the normal optical pulse pair at each point on the sensing fiber in the longitudinal direction from the scattered light signal acquired based on the normal optical pulse pair, and the detected phase value of the normal optical pulse pair may be corrected according to the expression (1-7) by using the gradient $A_{k,c}$ and the vertical axis intercept $B_{k.c}$ of the approximate straight line.

In order to explain the reason that the difference in response to the dynamic strain (vibration) using probe light of different optical frequencies can be suppressed by the correction based on the expression (1-7), the expression (1-7) is actually developed.

[Math. 1-8]

$$\begin{aligned}\alpha_k((k+Nn)T_N) = \frac{\sum_{k=1}^{N}A_k}{N}\cdot f((k+Nn)T_N) + \frac{\sum_{k=1}^{N}A_k}{N}\cdot B_c &= \\ A_{ave}\cdot f((k+Nn)T_N) + A_{ave}\cdot B_c\end{aligned} \tag{1-8}$$

Here, the average value of $A_k$ is taken as $A_{ave}$. Since $A_{ave,c}$ is obtained by dividing $A_{ave}$ by $A_c$, $A_{ave}$ and $A_{ave,c}$ are different. In the expression (1-8), the proportional coefficient with respect to the vibration waveform f(t) is $A_{ave}$, regardless of the kind k of the pulse pair (the main optical frequency $f_k$ on condition of M=1), and in the expression (5), the problem of different proportional coefficients $A_k$ in the pulse pairs of different k has been overcome. Furthermore, it is known that, by averaging the responses of as many different frequencies as possible, the difference from the expressions (1) and (2), which are ideal responses generated with the change of the speckle pattern, is reduced (e.g., NPL 4), and since $A_{ave}$ that is the average of $A_k$ representing the response of each pulse pair is a proportional constant of the vibration waveform f(t) in the expression (1-8), it can be seen that a waveform faithful to actual vibration is obtainable as compared with using the expression (5) without change. Since the constant components $A_{ave} \cdot B_c$ of the expression (1-8) have common values for different kinds of pulse pairs, the problem of strain of the vibration waveform due to the presence of the constant components does not occur.

In the above description, although the calculation has advanced on assumption that the slope of the approximate straight line and the vertical axis intercept accurately match $A_k/A_c$ or $B-(A_k/A_c)\cdot B_c$ in the procedure 3 and the following procedures, noise, which is actually present, also causes errors from $A_k/A_c$ or $B-(A_k/A_c)\cdot B_c$, in the slope and the vertical axis intercept of the approximate straight line. When the error becomes large, the phase obtained in the procedure 4 may cause a problem that the noise level becomes higher with respect to the phase of the expression (5). In order to avoid this point, the present invention can be used such that, by narrowing down the data for calculation to data of the point and time zone where vibration is occurring in the procedure 1 to the procedure 4 of the present invention, a waveform faithful to actual vibration can be obtained in the point and the time zone where vibration is occurring, as compared with using the expression (5) without change.

Further, the above inventions can be combined as far as possible.

INDUSTRIAL APPLICABILITY

The optical fiber testing method and the optical fiber testing apparatus according to the present disclosure can be applied to the information communication industry.

REFERENCE SIGNS LIST

1 CW light source
2 Coupler
3 Optical modulator
4 Optical pulse
5 Circulator
6 Measurement subject optical fiber
7 90-Degree optical hybrid
8 Coupler
9 Coupler
10 Phase shifter
11 Coupler
12 Coupler
13 Balance detector
14 Balance detector
15 Electrical signal
16 Electrical signal
17 Signal processing device
31 Vibration measuring device

The invention claimed is:

1. An optical pulse testing method for measuring vibration by means of phase optical time-domain reflectometry (OTDR), the optical pulse testing method comprising:

preparing a group combination including N+1 groups arranged in order of N×M optical pulses with different optical frequencies from $f_1$ to $f_{NM}$;

forming a first pulse pair combination including N(N+1) pulse pairs generated by dividing a whole arrangement of the optical pulses of the group combination for every M pieces from the left, and making the first pulse pair combination incident on a sensing fiber as a frequency multiplexed optical pulse;

generating a second pulse pair combination by adding a compensation optical pulse with a predetermined compensation optical frequency $f_{NM+1}$ different from the optical frequency in the specific optical pulse pair being the 1+d (N+1)-th pulse pair in the pulse pair combination;

making the second pulse pair combination incident on the sensing fiber as a frequency multiplexed optical pulse;

acquiring a scattered light signal for each of the optical frequency and the compensation optical frequency from the specific optical pulse pair that is incident including the compensation optical pulse;

calculating a phase value of an optical pulse pair contained in the first pulse pair combination by averaging signals of different optical frequencies included in the pulse pair for each point on the sensing fiber in a longitudinal direction from the scattered light signal, calculating a phase value of the compensation optical frequency by averaging signals of different optical frequencies included in the compensation optical frequency for each point on the sensing fiber in the longitudinal direction from the scattered light signal;

plotting the phase value of the optical pulse pair and the phase value of the compensation optical frequency detected for each point on the sensing fiber in the longitudinal direction on a two-dimensional plane having the phase value of the compensation optical frequency represented by a horizontal axis and the phase value of the optical pulse pair represented by a vertical axis;

calculating an approximate straight line for the plotted data for each optical pulse pair; and correcting the phase value of the optical pulse pair according to an expression (C1) by using a gradient $A_{k,c}$ and a vertical axis intercept $B_{k,c}$ of the approximate straight line calculated for each optical pulse pair:

$$\alpha_k((k+Nn)T_N) = \frac{\psi_k((k+Nn)T_N) - B_{k,c}}{A_{k,c}} A_{ave,c} \tag{C1}$$

wherein, k represents a kind of an optical pulse pair, $\alpha_k$ represents a phase value of a k-th kind of the optical pulse pair, n represents an arbitrary integer, $T_N$ represents the constant interval, N represents the number of pulse pairs multiplexed, M represents an arbitrary natural number, d represents 0, 1, . . . , (N−1), $\psi_k$ represents a phase value of the k-th kind of the optical pulse pair derived from a single optical frequency or by averaging optical frequencies in the optical pulse pair such that averaging is performed only upon occurrence of more than one optical frequency in the optical pulse pair, and $A_{ave,c}$ represents an average value of the gradients $A_{k,c}$ with respect to k.

2. The optical pulse testing method according to claim 1, wherein, when the compensation optical frequency included in the specific optical pulse pair is plural, the calculation of the phase value of the compensation optical frequency is performed by averaging signals of different optical frequencies included in the compensation optical frequencies to suppress fading noise.

3. The optical pulse testing method according to claim 1, further comprising:

acquiring a scattered light signal from a normal optical pulse pair other than the 1+d (N+1)-th optical pulse pair;

detecting the phase value of the optical pulse pair contained in the first pulse pair combination by averaging the signals of the optical frequencies included in the normal optical pulse pair at each point on the sensing fiber in the longitudinal direction from the scattered light signal acquired based on the normal optical pulse pair; and correcting the detected phase value of the normal optical pulse pair according to expression (C1) by using the gradient $A_{k,c}$ and the vertical axis intercept $B_{k,c}$ of the approximate straight line.

4. An optical pulse testing apparatus for measuring vibration by means of phase OTDR, the optical pulse testing apparatus comprising:

a light source configured to prepare a group combination including N+1 groups arranged in order of N×M optical pulses from f1 to fNM, form a first pulse pair combination including N(N+1) pulse pairs generated by dividing a whole arrangement of the optical pulses of the group combination for every M pieces from the left, and make the first pulse pair combination incident on a sensing fiber (6) as a frequency multiplexed optical pulse, generate a second pulse pair combination by adding a compensation optical pulse with a predetermined compensation optical frequency fNM+1 different from the optical frequency in a specific optical pulse pair being the 1+d (N+1)-th pulse pair in the pulse pair combination, and make the second pulse pair combination incident on the sensing fiber as a frequency multiplexed optical pulse;

a light receiver configured to acquire a scattered light signal for each of the optical frequencies and the compensation optical frequency from the specific optical pulse pair that is incident including the compensation optical pulse; and a signal processing unit configured to calculate a phase value of an optical pulse pair contained in the first pulse pair combination by averaging signals of different optical frequencies included in the pulse pair for each point on the sensing fiber in the longitudinal direction from the scattered light signal, calculate a phase value of the compensation optical frequency for each point on the sensing fiber in the longitudinal direction from the scattered light signal, plot the phase value of the optical pulse pair and the phase value of the compensation optical frequency detected for each point on the sensing fiber in the longitudinal direction on a two-dimensional plane having the phase value of the compensation optical frequency represented by a horizontal axis and the phase value of the optical pulse pair represented by a vertical axis, calculate an approximate straight line for the plotted data for each optical pulse pair, and correct the phase value of the optical pulse pair according to expression (C2) by using a gradient Ak,c and a vertical axis intercept Bk,c of the approximate straight line calculated for each optical pulse pair:

$$\alpha_k((k+Nn)T_N) = \frac{\psi_k((k+Nn)T_N) - B_{k,c}}{A_{k,c}} A_{ave,c} \qquad (C2)$$

wherein, k represents a kind of an optical pulse pair (an optical frequency when fading is not suppressed), $\alpha_k$ represents a phase value of a k-th kind of the optical pulse pair, n represents an arbitrary integer, $T_N$ represents the constant interval, N represents the number of pulse pairs multiplexed, M represents an arbitrary natural number, d represents 0, 1, . . . , (N−1), $\psi_k$ represents a phase value of the k-th kind of the optical pulse pair derived from a single optical frequency or by averaging optical frequencies in the optical pulse pair such that averaging is performed only upon occurrence of more than one optical frequency in the optical pulse pair, and $A_{ave,c}$ represents an average value of the gradients $A_{k,c}$ with respect to k.

5. The optical pulse testing apparatus according to claim 4, wherein, when the compensation optical frequency included in the specific optical pulse pair is plural, the signal processing unit is configured to calculate the phase value of the compensation optical frequency by averaging signals of different optical frequencies included in the compensation optical frequencies to suppress fading noise.

6. The optical pulse testing apparatus according to claim 4, wherein a scattered light signal is acquired from a normal optical pulse pair other than the 1+d (N+1)-th optical pulse pair, the phase value of the optical pulse pair contained in the first pulse pair combination is detected by averaging the signals of the optical frequencies included in the normal optical pulse pair at each point on the sensing fiber in the longitudinal direction from the scattered light signal acquired based on the normal optical pulse pair, and the detected phase value of the normal optical pulse pair is corrected according to expression (C2) by using the gradient $A_{k,c}$ and the vertical axis intercept $B_{k,c}$ of the approximate straight line.

* * * * *